US009482551B1

(12) United States Patent
Heinrich (10) Patent No.: US 9,482,551 B1
(45) Date of Patent: Nov. 1, 2016

(54) AIRSPACE PERFORMANCE DEPICTIONS USING VERTICAL AND LATERAL GUIDANCE BARS

(75) Inventor: Richard E. Heinrich, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1217 days.

(21) Appl. No.: 13/107,263

(22) Filed: May 13, 2011

(51) Int. Cl.
*G01C 23/00* (2006.01)
(52) U.S. Cl.
CPC ..................................... *G01C 23/00* (2013.01)
(58) Field of Classification Search
CPC combination set(s) only.
See application file for complete search history.

(56) References Cited

U.S. PATENT DOCUMENTS

| 5,623,414 A * | 4/1997 | Misra ............................ 701/478 |
| 8,532,849 B1 * | 9/2013 | Tsai ....................... G01C 23/00 340/979 |
| 2010/0010694 A1 * | 1/2010 | Johnson et al. .................. 701/9 |
| 2010/0052949 A1 * | 3/2010 | Suddreth et al. ........ 340/995.19 |
| 2012/0150426 A1 * | 6/2012 | Conway ........................ 701/120 |

OTHER PUBLICATIONS

DiBenedetto, Micahel F., Ph.D., Assessing the Validity of Using Actual Navigation Performance (ANP) Information for Supporting Designated Flight Inspection Operations, Dec. 2008, Technical Memorandum OU/AEC 08-12TM15689/0004-1, p. 4 and figures 1-6.*

* cited by examiner

*Primary Examiner* — Brian Zimmerman
*Assistant Examiner* — Cal Eustaquio
(74) *Attorney, Agent, or Firm* — Angel N. Gerdzhikov; Donna P. Suchy; Daniel M. Barbieri (57) ABSTRACT

A system for presenting performance attributes on a display unit on an aircraft is disclosed. The system may include a communication module for receiving the RNP for the aircraft, a navigation module for determining the position of the aircraft as well as its ANP, and a processing module for generating an integrated graphical representation of these performance attributes. The processing module may generate a cross-sectional depiction of a virtual tunnel based on the RNP and the position of the aircraft, wherein the cross-sectional depiction may include a first containment limit indicator and a second containment limit indicator. The processing module may also generate an aircraft position indicator, wherein the aircraft position indicator may indicate the position of the aircraft as well as the ANP of the aircraft. The cross-sectional depiction of the tunnel and the aircraft position indicator may be displayed on a display unit in a two-dimensional manner.

20 Claims, 8 Drawing Sheets

AIRSPACE PERFORMANCE DEPICTIONS USING VERTICAL AND LATERAL GUIDANCE BARS

CROSS-REFERENCE TO RELATED APPLICATIONS

This application is related to co-pending U.S. patent application Ser. No. 12/893,264 filed on Sep. 29, 2010 and entitled "System, Module, and Method for Presenting Course Deviation Information on an Aircraft Display Unit," which is incorporated herein by reference.

TECHNICAL FIELD

The present disclosure relates generally to aircraft display units and more particularly to a display unit suitable for displaying performance attributes for performance airspace operations.

BACKGROUND

Required Navigation Performance (RNP) is a type of performance-based navigation that allows an aircraft to fly a specific path between two three-dimensionally defined points in space. For example, each phase of flight may be assigned a virtual tunnel (may be referred to as "tunnel/highway in the sky") through which the aircraft is required to traverse through. The dimension of a particular tunnel is established by the RNP of that particular phase of flight. The RNP may further establish the level of performance required for that phase of flight. For instance, an RNP of 10 means that an aircraft navigation system must be able to calculate its position to within a circle with a radius of 10 nautical miles. An RNP of 0.3 means the aircraft navigation system must be able to calculate its position to within a circle with a radius of three-tenths of a nautical mile.

Such a performance-based navigation may further require on-board navigation performance monitoring and/or alerting. That is, the aircraft navigation system (or the flight management system in general) may be configured to determine an Actual Navigation Performance (ANP). ANP is the flight management system's estimate of the quality of its position determination, or its current performance. The lower the ANP, the more confident the flight management system is of its position estimate.

A pilot may be required to mentally process various types of information when flying through a tunnel in the sky. Such information may include the containment limits of the RNP, the current position of the aircraft, the ANP of the aircraft and the like. Furthermore, because such information may be provided by different devices/instruments, the pilot may be required to continuously read data from different devices/instruments. Therein lies the need to provide an integrated graphical representation of the performance attributes for performance-based navigation operations.

SUMMARY

The present disclosure is directed to a system for presenting performance attributes on a display unit on an aircraft. Various performance attributes such as the containment limits of the RNP, the current position of the aircraft, the ANP of the aircraft or the like may be integrated into a single display. The system may include a communication module configured for receiving the RNP for the aircraft, a navigation module configured for determining the position of the aircraft as well as its ANP, and a processing module for generating an integrated graphical representation of the performance attributes. The processing module may generate a cross-sectional depiction of the virtual tunnel based on the RNP and the position of the aircraft, wherein the cross-sectional depiction of the virtual tunnel may include a first containment limit indicator and a second containment limit indicator. The processing module may also generate an aircraft position indicator, wherein the aircraft position indicator may indicate the position of the aircraft with respect to the cross-sectional depiction of the virtual tunnel as well as the ANP of the aircraft. The cross-sectional depiction of the virtual tunnel and the aircraft position indicator may be displayed on a display unit in a two-dimensional manner.

A further embodiment of the present disclosure is directed to a method for generating a graphical representation of performance attributes for displaying on an aircraft. The method may include receiving the RNP, the ANP and the position of the aircraft; generating a cross-sectional depiction of a tunnel based on the RNP and the position of the aircraft, the cross-sectional depiction of the tunnel including a first containment limit indicator and a second containment limit indicator; generating an aircraft position indicator, the aircraft position indicator indicating the position of the aircraft with respect to the cross-sectional depiction of the tunnel, the aircraft position indicator further indicating the ANP of the aircraft; and displaying the cross-sectional depiction of the tunnel and the aircraft position indicator in a two-dimensional representation.

In addition, the method for generating the graphical representation of performance attributes for displaying on the aircraft may further include receiving a position and an ANP of a second aircraft; generating a second aircraft position indicator for the second aircraft, the second aircraft position indicator indicating the position of the second aircraft with respect to the cross-sectional depiction of the tunnel, the second aircraft position indicator further indicating the ANP of the second aircraft; and displaying the cross-sectional depiction of the virtual tunnel, the first mentioned aircraft position indicator and the second aircraft position indicator in the two-dimensional representation.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 2 illustrates a tunnel in the sky of which an aircraft is required to traverse through;

DETAILED DESCRIPTION

Reference will now be made in detail to exemplary embodiments of the disclosure, examples of which are illustrated in the accompanying drawings.

The present disclosure is directed to a system and method for presenting performance attributes on a display unit on an aircraft. Various performance attributes such as the containment limits of the RNP, the current position of the aircraft, the ANP of the aircraft or the like may be integrated into a single display to enhance high performance-based navigation operations. Furthermore, the performance attributes may be presented in a two-dimensional manner, allowing the system and method in accordance with the present disclosure to be utilized on any two-dimensional display unit.

Figure 1:
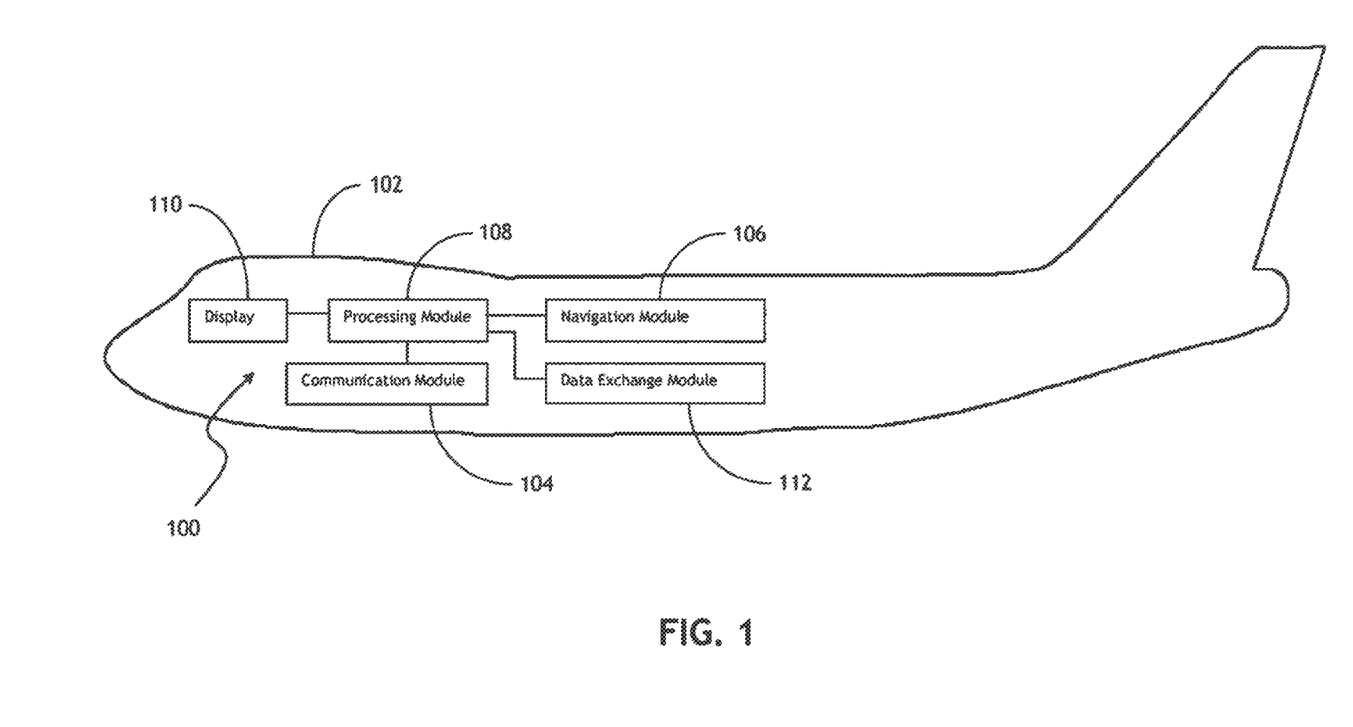
FIG. 1 is a block diagram illustrating a system for presenting performance attributes on an aircraft.

Referring to FIG. 1, a block diagram depicting a system 100 for presenting performance attributes for an aircraft 102 is shown. A communication module 104 may be located on-board the aircraft 102 for receiving Required Navigation Performance (RNP) for the aircraft 102. For example, the RNP may be assigned when the flight plan is filed and received prior to the departure of the aircraft 102. The RNP may specify at least one tunnel of which the aircraft 102 is required to traverse through during its flight.

Also located on-board the aircraft 102 is a navigation module 106. The navigation module 106 may be configured to determine/estimate a position of the aircraft 102 during its flight. For instance, the navigation module 106 may include one or more positioning devices such as a Global Positioning System (GPS), an Inertial Navigation System (INS), a radio navigation system, a radar navigation system or the like. Furthermore, the navigation module 106 may also be configured to determine the actual performance of the aircraft, or the ANP. That is, should any sensor utilized for estimating the position of the aircraft degrades, the accuracy of the estimated position of the aircraft may therefore be reduced. The reduced accuracy may be reflected in the ANP. Generally, lower ANP represents more accurate position estimation.

The system 100 for presenting performance attributes in accordance with the present disclosure further includes a processing module 108 located on-board the aircraft 102. The processing module 108 may be communicatively connected (e.g., through wired or wireless communication interfaces) to the communication module 104 and the navigation module 106. The processing module 108 is configured for generating an integrated graphical representation of the RNP information, the position of the aircraft and the ANP of the aircraft. The integrated graphical representation may then be provided to the display unit 110 for display.

It is understood that while the different components of the system 100 such as the communication module 104, the navigation module 106 and the processing module 108 are depicted separately in FIG. 1, they are not necessarily required to be implemented as separate devices. For instance, they may be packaged as a part of the flight management system that supports performance-based navigation operations. On the other hand, some components of the system 100 may be implemented as separate devices that may be adapted to be installed on an existing flight management system. In this manner, the system 100 of the present disclosure may be utilized to retrofit an older aircraft to support performance-based navigation operations.

Figure 2:
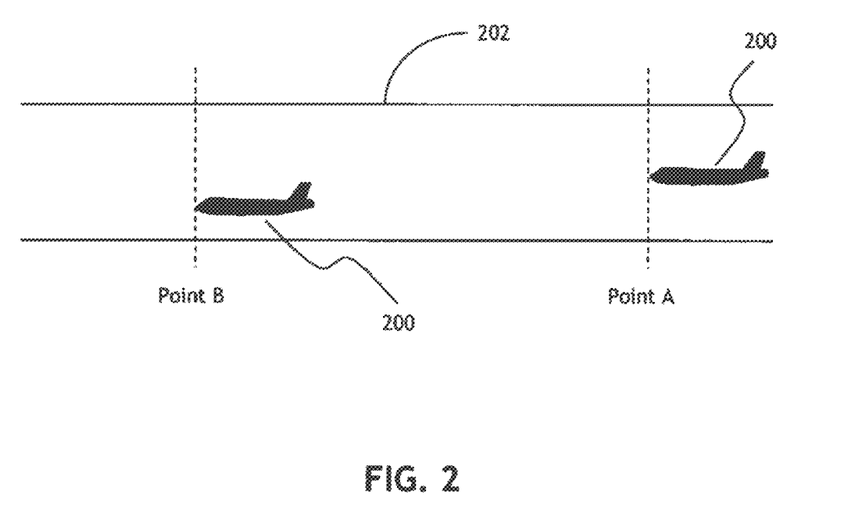

Referring to FIGS. 2 through 3, exemplary graphical representations generated by the processing module 108 are shown. As illustrated in FIG. 2, an aircraft 200 may traverse through a tunnel 202 in the sky as required per RNP. It is understood that the tunnel 202 as shown in FIG. 2 is merely exemplary; laterally and/or vertically curved tunnels may be specified by the RNP without departing from the spirit and scope of the present disclosure.

The processing module 108 may be configured to generate a cross-sectional depiction of the tunnel 202 based on the RNP and the position of the aircraft 200. The cross-sectional depiction of the tunnel may represent the tunnel boundaries (RNP containment limits) as viewed from the position of the aircraft in its direction of travel. In one embodiment, the cross-sectional depiction of the tunnel boundaries may be depicted utilizing grid representation as illustrated in FIG. 3. For instance, the cross-sectional depiction may include a set of inner grid lines 204 to represent a first containment limit indicator that indicates the 95% RNP containment limit. The cross-sectional depiction may further include a set of outer grid lines 206 to represent a second containment limit indicator that indicates the 99.999% RNP containment limit.

Figure 3A:
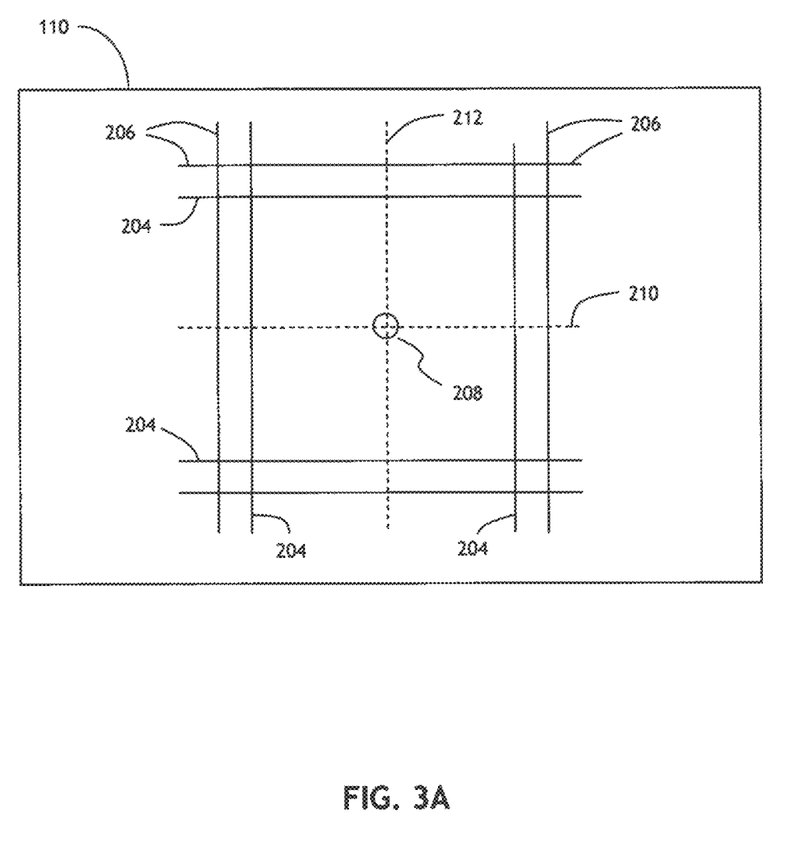
FIG. 3 illustrates the presentation of performance attributes on the aircraft as the aircraft traverses through the tunnel in the sky.
Figure 3B:
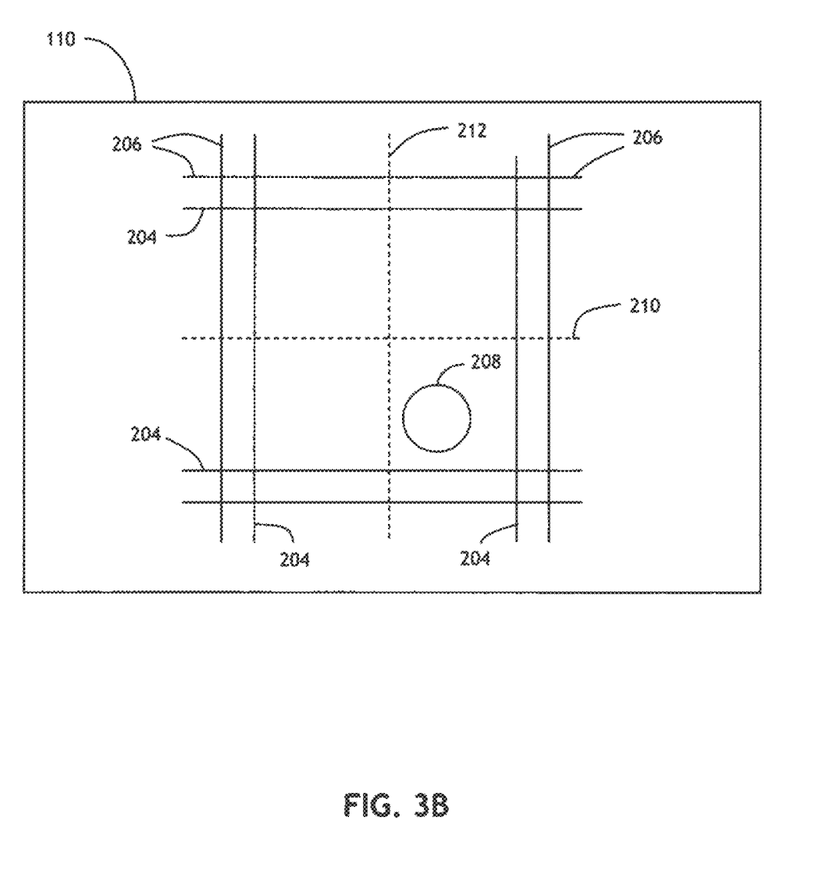

The processing module 108 may be further configured to generate an aircraft position indicator 208 to indicate the position of the aircraft 200 with respect to the cross-sectional depiction of the tunnel (as viewed from the position of the aircraft in its direction of travel). For example, suppose the aircraft 200 is flying through the center of the tunnel at point A, the aircraft position indicator 208 may therefore be centered within the cross-sectional depiction of the tunnel as shown in FIG. 3A. Furthermore, one or more reference grid lines may be presented to indicate the desired course of flight. For example, a desired vertical course indicator 210 and a desired lateral course indicator 212 may be provided so that if the position of the aircraft 200 with respect to the cross-sectional depiction of the tunnel is off-centered (as illustrated in FIG. 3B), the pilot may use the desired vertical course indicator 210 and the desired lateral course indicator 212 as references in order to guide the aircraft 200 back to the desired course of flight.

It is contemplated that the position of the aircraft 200 may be an estimated position provided by the navigation module 106. The accuracy of the estimated position may vary due to various factors, such as the intrinsic accuracy characteristics of the navigation system that is utilized, visibility of navigation satellites, sensor performance as well as various other factors. The actual navigation performance, or the ANP, is a typical performance attribute utilized to indicate the quality of the position estimation. Generally, lower ANP represents more accurate position estimation. It may be appreciated for the processing module 108 to integrate the ANP information into the aircraft position indicator 208.

In one embodiment, the size of the aircraft position indicator 208 may be associated with the ANP of the aircraft 200. For instance, the ANP of the aircraft 200 may be of a first value when the aircraft flies through point A, in which case the ANP may be indicated by the aircraft position indicator 208 having a first size as illustrated in FIG. 3A. However, suppose the accuracy of position estimation reduces (therefore the ANP increases) when the aircraft flies through point B, the aircraft position indicator 208 may therefore increase in size to reflect the increase of the ANP as illustrated in FIG. 3B. In one embodiment, the size of the aircraft position indicator 208 may be adjusted in real-time based on real-time ANP information. Furthermore, if the size of the position indicator continues to increase beyond an allowable threshold (i.e., the accuracy of position estimation continues to reduce), a notification (audio and/or visual) may be triggered to alert the pilot.

It is contemplated that various types of graphical representations may be utilized to represent the aircraft position indicator 208. For instance, the aircraft position indicator 208 may be represented as a circle, wherein the center of circle may be utilized to indicate the estimated position of the aircraft 200 with respect to the cross-sectional depiction of the tunnel, and the radius of the circle may be configured to be proportional to the ANP. In this manner, as long as the circumference of the circle does not intersect with the tunnel boundaries (i.e., RNP containment limits), the flight of the aircraft 200 may be considered to be within the RNP containment limits. However, various conditions may cause the circumference of the circle to intersect with the tunnel boundaries. For instance, if the position of the aircraft 200 with respect to the cross-sectional depiction of the tunnel deviates away from the centered too much, or if the accuracy of position estimation continues to degrade (or a combination of these factors), the circumference of the circle may intersect with the tunnel boundaries. When such a situation occurs, a notification (audio and/or visual) may be triggered and corrective actions may be taken by the pilot to guide the aircraft back to the required course of flight.

Figure 4A:
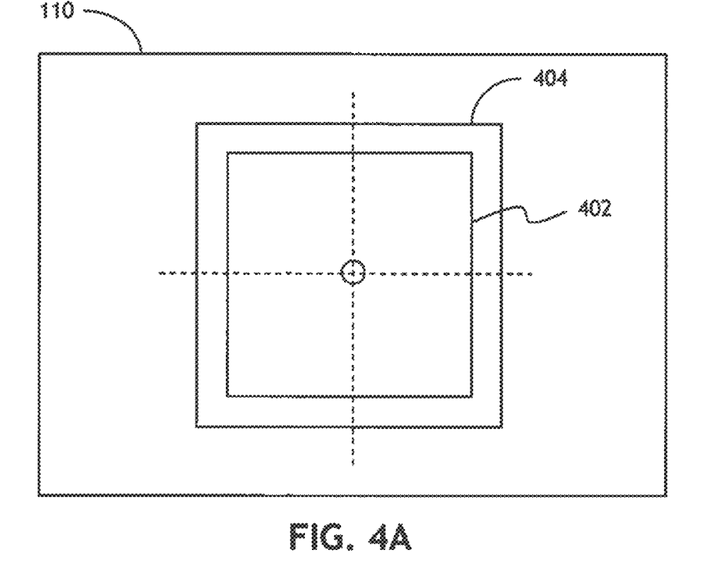
FIG. 4 illustrates various representations of the containment limit indicators.
Figure 4B:
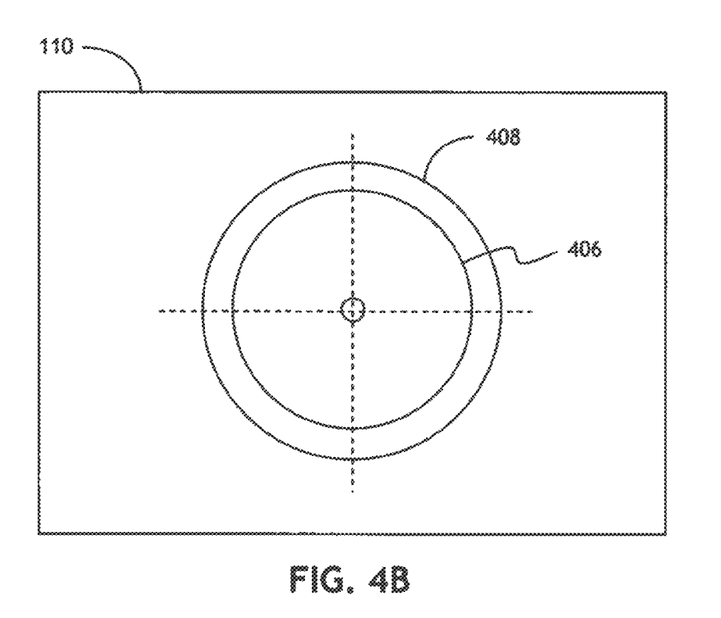

It is also contemplated that the circular representations of the aircraft position indicator 208 described above are merely exemplary; various other types of two-dimensional graphical representations (e.g., rectangles or the like) may be utilized to represent the aircraft position indicator 208 without departing from the spirit and scope of the present disclosure. Furthermore, the representations of the tunnel boundaries may not be limited to grid lines 204 and 206 as illustrated in FIG. 3. FIG. 4 shows some alternatively graphical representations that may be utilized to indicate the containment limits. For instance, the inner grid lines 204 of FIG. 3 may be represented as an inner containment box 402 or an inner containment circle 406 in FIGS. 4A and 4B, respectively. Similarly, the outer grid lines 206 of FIG. 3 may be represented as an outer containment box 404 or an outer containment circle 408 in FIGS. 4A and 4B, respectively. It is understood that other graphical representations may also be utilized without departing from the spirit and scope of the present disclosure.

It is further contemplated that the system 100 for presenting performance attributes in accordance with the present disclosure may also be utilized during operations in high capacity airspace. Since more than one aircraft may be directed to traverse through a tunnel in such operation conditions, the performance attributes associated with each aircraft traversing through the same tunnel may be displayed on the display unit 110.

Figure 5:
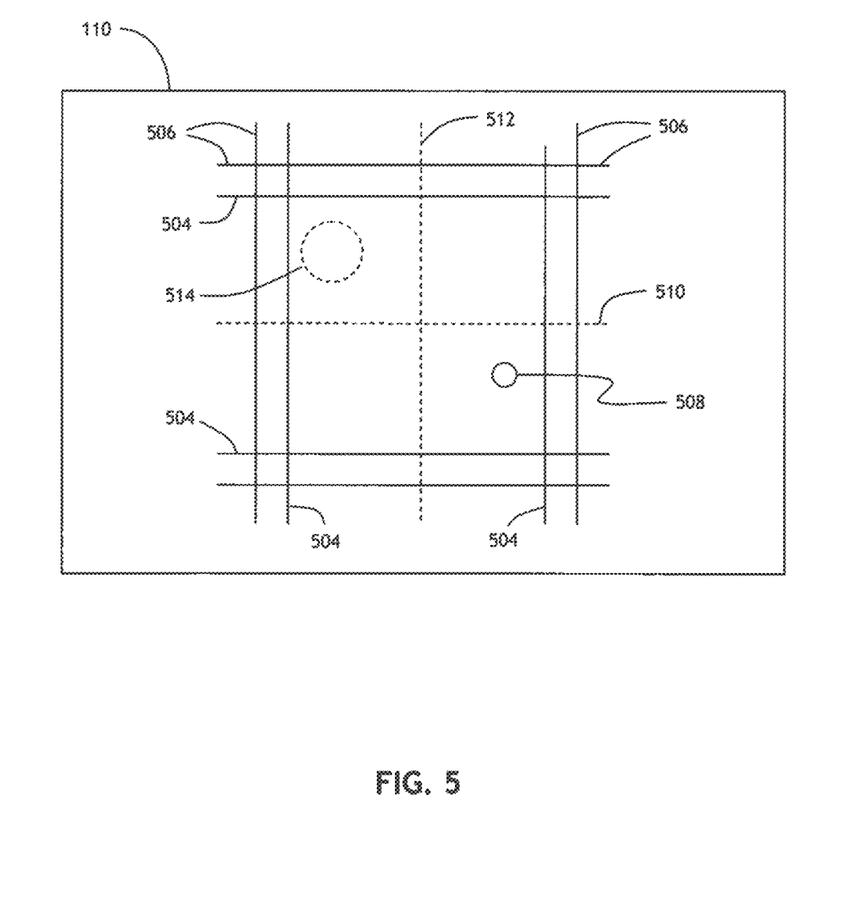
FIG. 5 illustrates an exemplary graphical representation depicting two aircrafts traversing through a tunnel.

Referring to FIG. 5, an exemplary graphical representation depicting two aircrafts traversing through a tunnel is shown. This graphical representation may be displayed on one of the aircrafts (referred to as the first aircraft), and it may indicate to the pilot of the first aircraft the positions of the first aircraft with respect to the tunnel as well as the position of the other aircraft (referred to as the second aircraft). It is understood that the tunnel boundaries 504 and 506, the desired course indicators 510 and 512, as well as the aircraft position indicator 508 for the first aircraft may be generated by the processing module 108 as previously described.

For system 100 located on the first aircraft to display the position indicator 514 for the second aircraft, the system 100 may be communicatively connected to a data exchange module 112 configured for receiving positional information from the second aircraft. For instance, Automatic Dependent Surveillance-Broadcast (ADS-B) technology may be utilized, where the second aircraft may determine its own position and periodically broadcasts its position and other relevant information (e.g., the ANP of the second aircraft) to the first aircraft. It is understood that various other technologies may be utilized to exchange positional information between aircrafts without departing from the spirit and scope of the present disclosure.

Once the position and other relevant information of the second aircraft is received at the data exchange module 112 located on the first aircraft, such information may be provide to the processing module 108, which may then generate the position indicator 514 for the second aircraft in a similar manner as the position indicator 508 for the first aircraft. That is, the center of the position indicator 514 may indicate the position of the second aircraft with respect to the cross-sectional depiction of the tunnel, and the size of the position indicator 514 may indicate the ANP of the second aircraft.

It is contemplated that the processing module 108 may generate position indicators for more than two aircrafts when more than two aircrafts are traversing through the same tunnel. Furthermore, for ease of identification, the position indicator that represents the aircraft of which the processing module 108 is installed (e.g., the first aircraft in this example) may be made visually distinct from the position indicators of the other aircrafts. Such distinctions may include different shapes, colors, shadings or the like.

The ability to provide multiple position indicators in an integrated display may enhance flight safety while maintaining flexibility to support high capacity operations in flow corridors and other high density environments. For instance, as long as the circumference of the position indicator for the aircraft of which the processing module 108 is installed (e.g., the first aircraft in this example) does not intersect with the tunnel boundaries and/or the position indicators of other aircrafts, then the flight of this aircraft may be considered to be safe. Otherwise, if the circumference of the circle intersects with the tunnel boundaries and/or the position indicators of the other aircrafts, a notification (audio and/or visual) may be triggered to alert the pilot of such a situation.

In addition, indicating the relative placement of the aircrafts with respect to each other may allow the selection of lateral offsets to be used as a methodology for delegated separation maneuvers and may provide a relative indication of the selected aircraft for paired operations. Furthermore, in the event that an individual aircraft performance degrades (i.e., its ANP increases), the size of its position indicator may increase in size. If the size of the position indicator continues to increase beyond an allowable threshold, a notification (audio and/or visual) may be triggered and some level of corrective action may be taken.

The same concept may be applied when flying in terminal areas where merging and sequencing of aircraft can be depicted in tunnels with reduced dimensions driven by RNP 0.3 or RNP 0.1 operations. Utilizing the system of the present disclosure, aircrafts above and below may be depicted to support the relative positions during optimized profile descents.

Figure 6:
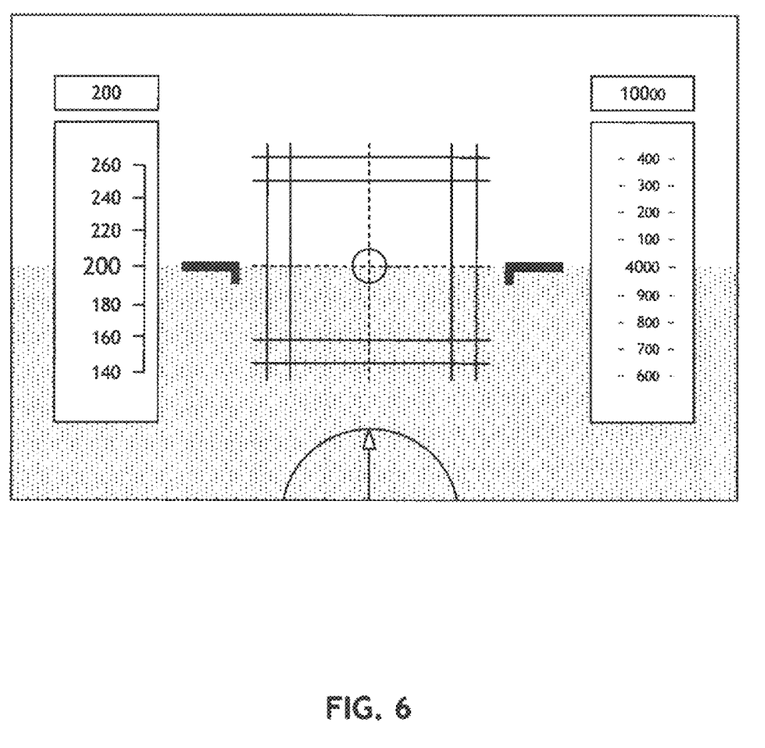
FIG. 6 illustrates the presentation of performance attributes integrated with an electronic attitude indicator.

It is contemplated that the graphical representation in accordance with the present disclosure may be displayable in any two-dimensional display unit. Such ability may be appreciated in older aircrafts with less integrated displays. In addition, the graphical representation may be integrated with an existing display unit. For example, as illustrated in FIG. 6, the graphical representation in accordance with the present disclosure may be integrated with an electronic attitude indicator used in typical electronic flight displays. Utilizing the system of the present disclosure may eliminate the need for the traditional lateral and vertical deviation indicator while allowing the crew to know exactly how off (or centered) the aircraft is in relation to the desired path. Such ability may be particularly appreciated when combined with a synthetic vision system (SVS) and/or an enhanced vision system (EVS).

Figure 7:
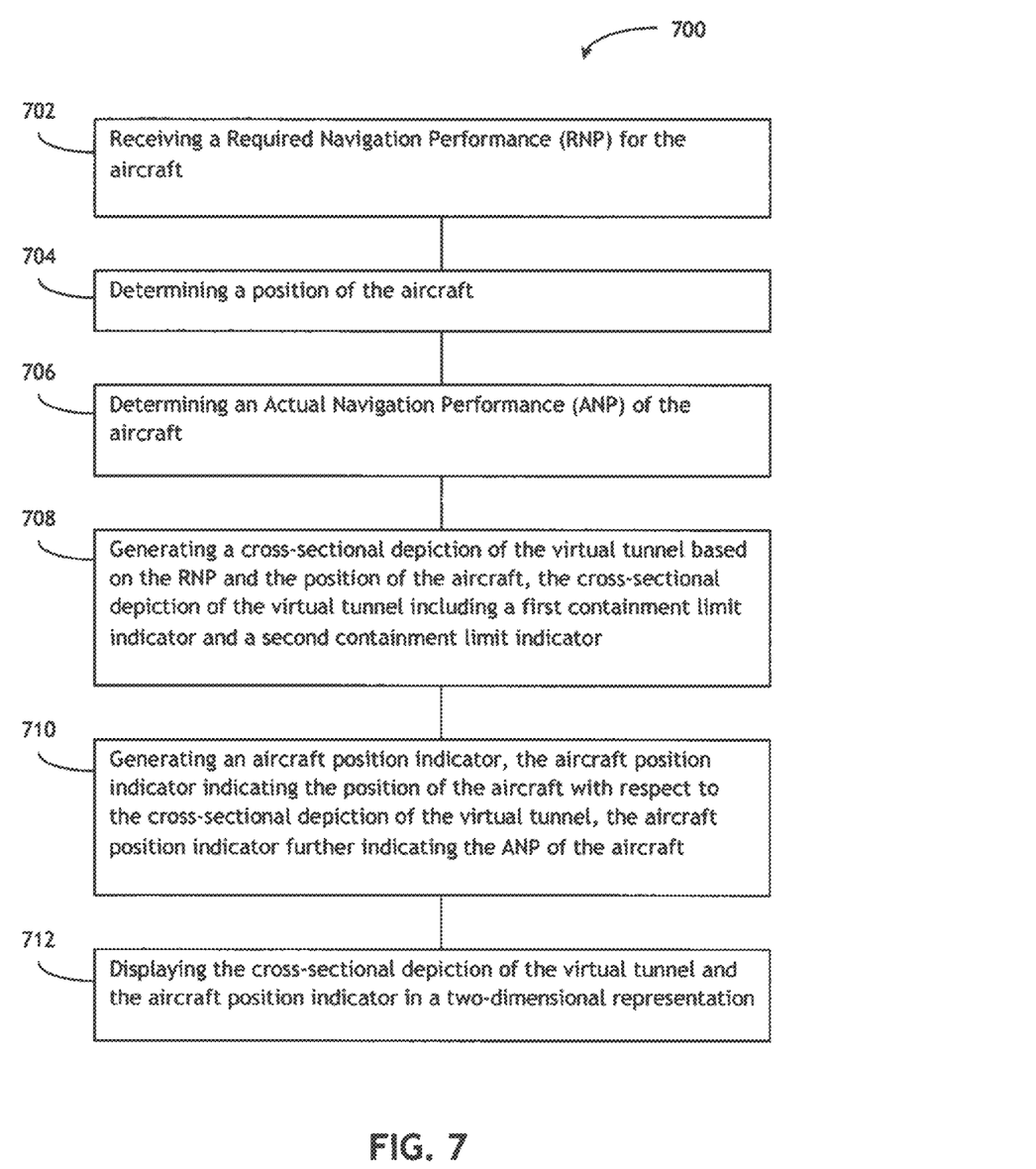
FIG. 7 is a flow chart illustrating a method for generating a graphical representation of performance attributes for displaying on an aircraft.

Referring now to FIG. 7, a method 700 for generating a graphical representation of performance attributes for displaying on an aircraft is shown. The method 700 may be implemented as a part of the flight management/control system. For instance, step 702 may receive the Required Navigation Performance (RNP) for the aircraft. As described above, the RNP may specify at least one tunnel for the aircraft to traverse through. During the flight of the aircraft, step 704 may determine the current position of the aircraft and step 706 may determine the Actual Navigation Performance (ANP) of the aircraft.

In accordance with the present disclosure, the performance attributes including the RNP, the ANP, the position of the aircraft and the like may be presented in an integrated manner. For instance, step 708 may generate a cross-sectional depiction of the tunnel based on the RNP and the position of the aircraft. The cross-sectional depiction of the tunnel may include a first containment limit indicator and a second containment limit indicator as previously described. Furthermore, step 710 may generate an aircraft position indicator. The aircraft position indicator may indicate the position of the aircraft with respect to the cross-sectional depiction of the virtual tunnel as well as the ANP of the aircraft. Once the cross-sectional depiction of the tunnel and the aircraft position indicator are generated, they may be provided to the display unit for display.

It is contemplated that the method steps described above may also be carried out on devices separate from an existing flight management system. For instance, a processing module configured for executing the method steps may be adapted to be installed on an existing flight management system. The processing module may receive the RNP, the ANP, and the position of the aircraft from the flight management system, and the processing module may then generate the cross-sectional depiction of the tunnel and the aircraft position indicator and provide them to the display unit for display as previously described. It is further contemplated that additional steps such as generating notifications/alerts and/or providing additional aircraft position indicators may also be implemented as previously described.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system comprising:
   a receiver configured for receiving a Required Navigation Performance (RNP) for an aircraft, the RNP specifying a virtual tunnel for the aircraft to traverse through;
   a positioning device configured for determining a position of the aircraft and a quality measurement indicating an accuracy of the position of the aircraft determined by the positioning device;
   at least one processor communicatively connected to the receiver and the positioning device, the at least one processor configured to:
      generate a cross-sectional depiction of the virtual tunnel as viewed from the position of the aircraft in a direction of travel of the aircraft, the cross-sectional depiction of the virtual tunnel generated based on the RNP and the position of the aircraft, the cross-sectional depiction of the virtual tunnel including a first containment limit indicator and a second containment limit indicator; and
      generate an aircraft position indicator, the aircraft position indicator indicating the position of the aircraft determined by the positioning device with respect to the cross-sectional depiction of the virtual tunnel as viewed from the position of the aircraft in a direction of travel of the aircraft, the aircraft position indicator further indicating the accuracy of the position of the aircraft determined by the positioning device using a size of the aircraft position indicator; and
   a display unit communicatively connected to the at least one processor, the display unit configured for displaying the cross-sectional depiction of the virtual tunnel and the aircraft position indicator in a two-dimensional representation to help a pilot of the aircraft visualize the position of the aircraft along with the accuracy of the position of the aircraft with respect to the first containment limit indicator and the second containment limit indicator of the virtual tunnel.

2. The system of claim 1, wherein the first containment limit indicator indicates a 95% containment limit and the second containment limit indicator indicates a 99.999% containment limit.

3. The system of claim 2, wherein the cross-sectional depiction of the virtual tunnel further includes a desired vertical course indicator and a desired lateral course indicator.

4. The system of claim 1, wherein the size of the aircraft position indicator increases as the accuracy of the position of the aircraft determined by the positioning device decreases.

5. The system of claim 4, wherein the at least one processor is further configured for providing an alert based on at least one of: the position of the aircraft with respect to the cross-sectional depiction of the virtual tunnel, and the size of the aircraft position indicator.

6. The system of claim 1, wherein the aircraft is a first aircraft, and the system further comprising:
   a data receiver configured for receiving a position of a second aircraft; and the at least one processor further configured for generating a second aircraft position indicator for the second aircraft, the second aircraft position indicator indicating the position of the second aircraft with respect to the cross-sectional depiction of the virtual tunnel.

7. The system of claim 6, wherein the data receiver is further configured for receiving a quality measurement indicating an accuracy of the position of the second aircraft, and the at least one processor is further configured for indicating the accuracy of the position of the second aircraft utilizing a size of the second aircraft position indicator to help the pilot of the first aircraft visualize the position of the first aircraft along with the accuracy of the position of the first aircraft with respect to the position of the second aircraft along with the accuracy of the position of the second aircraft and with respect to the first containment limit indicator and the second containment limit indicator of the virtual tunnel.

8. A method comprising:
receiving a Required Navigation Performance (RNP) for an aircraft, the RNP specifying a virtual tunnel for the aircraft to traverse through;
determining a position of the aircraft;
determining a quality measurement indicating an accuracy of the determined position of the aircraft;
generating a cross-sectional depiction of the virtual tunnel as viewed from the position of the aircraft in a direction of travel of the aircraft, the cross-sectional depiction of the virtual tunnel generated based on the RNP and the position of the aircraft, the cross-sectional depiction of the virtual tunnel including a first containment limit indicator and a second containment limit indicator;
generating an aircraft position indicator, the aircraft position indicator indicating the position of the aircraft with respect to the cross-sectional depiction of the virtual tunnel as viewed from the position of the aircraft in a direction of travel of the aircraft, the aircraft position indicator further indicating the accuracy of the position of the aircraft using a size of the aircraft position indicator; and
displaying the cross-sectional depiction of the virtual tunnel and the aircraft position indicator in a two-dimensional representation to help a pilot of the aircraft visualize the position of the aircraft along with the accuracy of the position of the aircraft with respect to the first containment limit indicator and the second containment limit indicator of the virtual tunnel.

9. The method of claim 8, wherein the first containment limit indicator indicates a 95% containment limit and the second containment limit indicator indicates a 99.999% containment limit.

10. The method of claim 9, wherein the cross-sectional depiction of the virtual tunnel further includes a desired vertical course indicator and a desired lateral course indicator.

11. The method of claim 8, wherein the size of the aircraft position indicator increases as the accuracy of the position of the aircraft decreases.

12. The method of claim 11, further comprising:
providing an alert based on at least one of: the position of the aircraft with respect to the cross-sectional depiction of the virtual tunnel, and the size of the aircraft position indicator.

13. The method of claim 8, wherein the aircraft is a first aircraft, and the method further comprising:
receiving a position of a second aircraft; and
generating a second aircraft position indicator for the second aircraft, the second aircraft position indicator indicating the position of the second aircraft with respect to the cross-sectional depiction of the virtual tunnel.

14. The method of claim 13, further comprising:
receiving a quality measurement indicating an accuracy of the position of the second aircraft; and
indicating the accuracy of the position of the second aircraft utilizing a size of the second aircraft position indicator to help the pilot of the first aircraft visualize the position of the first aircraft along with the accuracy of the position of the first aircraft with respect to the position of the second aircraft along with the accuracy of the position of the second aircraft and with respect to the first containment limit indicator and the second containment limit indicator of the virtual tunnel.

15. A method for generating a graphical representation for displaying on an aircraft operating under a performance-based navigation specification, the method comprising:
receiving a Required Navigation Performance (RNP) for the aircraft, a position of the aircraft, and a quality measurement indicating an accuracy of the position of the aircraft;
generating a cross-sectional depiction of a virtual tunnel as viewed from the position of the aircraft in a direction of travel of the aircraft, the cross-sectional depiction of the virtual tunnel generated based on the RNP and the position of the aircraft, the cross-sectional depiction of the virtual tunnel including a first containment limit indicator and a second containment limit indicator;
generating an aircraft position indicator, the aircraft position indicator indicating the position of the aircraft with respect to the cross-sectional depiction of the virtual tunnel as viewed from the position of the aircraft in a direction of travel of the aircraft, the aircraft position indicator further indicating the accuracy of the position of the aircraft using a size of the aircraft position indicator; and
displaying the cross-sectional depiction of the virtual tunnel and the aircraft position indicator in a two-dimensional representation to help a pilot of the aircraft visualize the position of the aircraft along with the accuracy of the position of the aircraft with respect to the first containment limit indicator and the second containment limit indicator of the virtual tunnel.

16. The method of claim 15, wherein the first containment limit indicator indicates a 95% containment limit and the second containment limit indicator indicates a 99.999% containment limit.

17. The method of claim 16, wherein the cross-sectional depiction of the virtual tunnel further includes a desired vertical course indicator and a desired lateral course indicator.

18. The method of claim 15, wherein the size of the aircraft position indicator increases as the accuracy of the position of the aircraft decreases.

19. The method of claim 18, further comprising:
providing an alert based on at least one of: the position of the aircraft with respect to the cross-sectional depiction of the virtual tunnel, and the size of the aircraft position indicator.

20. The method of claim 15, wherein the aircraft is a first aircraft, and the method further comprising:
receiving a position of a second aircraft and a quality measurement indicating an accuracy of the position of the second aircraft;
generating a second aircraft position indicator for the second aircraft, the second aircraft position indicator indicating the position of the second aircraft with respect to the cross-sectional depiction of the virtual tunnel, the second aircraft position indicator further indicating the accuracy of the position of the second aircraft utilizing a size of the second aircraft position indicator; and displaying the cross-sectional depiction of the virtual tunnel, the first mentioned aircraft position indicator and the second aircraft position indicator in the two-dimensional representation to help the pilot of the first aircraft visualize the position of the first aircraft along with the accuracy of the position of the first aircraft with respect to the position of the second aircraft along with the accuracy of the position of the second aircraft and with respect to the first containment limit indicator and the second containment limit indicator of the virtual tunnel.

* * * * *